United States Patent [19]

Nelson

[11] 4,205,312

[45] May 27, 1980

[54] METHOD AND APPARATUS FOR CAUSING A DOT MATRIX DISPLAY TO APPEAR TO TRAVEL

[75] Inventor: Jack P. Nelson, Agoura, Calif.

[73] Assignee: Computer Kinetics Corporation, Westlake Village, Calif.

[21] Appl. No.: 850,778

[22] Filed: Nov. 11, 1977

[51] Int. Cl.[2] .......... G06K 15/18

[52] U.S. Cl. .......... 340/792; 340/752; 340/771

[58] Field of Search .......... 340/324 M, 339, 336, 340/792

[56] References Cited

U.S. PATENT DOCUMENTS 4,024,531 5/1977 Ashby .......... 340/324 M

*Primary Examiner*—David L. Trafton

[57] ABSTRACT

A method and apparatus for causing the display on a dot matrix display panel to appear to travel by advancing the characters of a message to be displayed in fractional character increments. The circuitry for causing the display characters to appear to travel across the display panel includes a display character generator for cyclically providing the display panel with character information column-by-column for all of the characters of a complete message, and display column enabling electronics for sequentially energizing each column of the display. An incrementing circuit increments either the display character generator or the display column enabling electronics by one column position after the complete message has been displayed and after the display character generator and display column enabling electronics are reset. This gives the appearance on the display panel that the characters of the message have shifted one column position to the left or right. After the next resetting function, the character generator or enabling electronics is incremented two column positions, thereby giving the appearance that the message has again shifted to the left or right an additional column position. This process is continued until a complete character has been shifted out of the visible display, at which time the display character generator is reloaded with the complete message shifted by one character position, and the incrementing circuit is reset so that after the first complete message of the refreshed (reloaded) character information is displayed, the incrementing circuit increments the display by one column position, and the steps described above are repeated.

22 Claims, 6 Drawing Figures

METHOD AND APPARATUS FOR CAUSING A DOT MATRIX DISPLAY TO APPEAR TO TRAVEL

BACKGROUND OF THE INVENTION

1. Field of the Invention

This invention relates to the field of display devices commonly used to present messages on a dot matrix, and in particular relates to an improved method and apparatus for modifying such a display device to present a message that appears to move, or travel, across the display device.

2. Description of the Prior Art

Display devices are commonly known in which messages are presented statically as a matrix of dots. The dots are illuminated or not depending upon the state of row-drive signals applied simultaneously to all of the dots in each of Y rows of dots and upon the state of a column-drive signal selectively applied to a column of dots in the matrix. Typically, the row-drive information is applied to the Y row-drive lines serially in time, as a synchronized clocking signal sequences through each column of the display. Such a display is known from U.S. Pat. No. 3,742,483, to James A. Ogle, entitled "Video Display System Using Display Panel". The Ogle display panel comprises a large number of small dot-like gas-filled cells, each of which has a drive circuit which can be energized to pass current therethrough to cause the cell to grow.

Reference is also made to Bulletin No. 1166D, dated October, 1974, of the Burroughs Corporation, Detroit, Michigan. The Burroughs Bulletin describes a display panel having a 5×7 dot matrix character format with two columns of space between each character for their 16-character display. Each character is defined by a 6-bit code, and the characters are scanned in a scanning mode entering characters from left to right. The first character is entered in the left-most position, and subsequent characters are entered sequentially into the next available space to the right. After the last character is displayed, a reset pulse is generated to initiate a new scan.

Each character may be formed by allowing or not allowing the individual dots to be visible. Characters are separated by columns or rows of dots that are not visible. This produces a visible (light) letter or symbol on a non-visible (dark) background. The non-visible and visible dots could be reversed to produce dark letters on a light background. Similarly, the space separating characters can be a horizontal row of non-visible dots for a display that "travels" vertically, or a vertical column of non-visible dots for a display that "travels" horizontally.

The Ogle U.S. Patent and the Burroughs Bulletin relate to displays which statically display a message, even though that message is refreshed cycically by the scanning mode described in the Burroughs Bulletin. As a result, a message composed of many characters may be presented on a display that would, without modification and improvement, only be capable of displaying a limited portion of the message.

A static message has several disadvantages, among which are that it could be unnoticed because it is not eye-catching. Additionally, the length of a message to be displayed is limited by the width of the display panel. In display systems which are purposely designed to catch the eye of the viewer, such as stock market report displays, displays for changing information at airport terminals and the like, and electronic games, causing the message to appear to travel would be a substantial and desirable improvement.

It is known in the prior art to construct an apparatus for generating a traveling display. Some previous methods have used mechanical means to progressively move the characters displayed in a dot matrix across the screen. However, such a mechanical means is subject to wear and physical breakage. Other prior art methods employ electronic means for effecting the moving display, but these methods have been limited to displays on cathode ray tubes. One such arrangement is shown in U.S. Pat. No. 3,742,482 to Albrecht, et al, the patent entitled, "Method and Apparatus for Generating a Traveling Display".

The Albrecht et al system generates a traveling display on a cathode ray tube by intensifying an electronic beam as it scans horizontally across the face of the CRT. The characters to be displayed are stored in a memory means with space being provided in the memory for a number of buffer characters waiting to be displayed. At a predetermined time in each cycle of the display, a determination is made of the number of buffer characters then awaiting display. Each character is formed from a plurality of strokes. Depending upon the number of buffer characters awaiting display, the display is shifted left by a selected number of character strokes for each display cycle. By varying the number of strokes that the display is advanced for each cycle in this way, the rate at which the display is moved may be varied as a function of the rate at which data to be displayed is received. The shifting by a small number of strokes for each cycle gives the illusion that the information is flowing smoothly across the display. The concepts and apparatus of Albrecht et al do not, however, apply to a dot-matrix display panel.

SUMMARY OF THE INVENTION

It is an object of the present invention to provide a method and apparatus for causing the display on a dot matrix display panel to appear to travel.

It is a further object of the invention to cause the characters of a displayed message in a dot matrix display to shift to the left or right by one column position periodically, thereby giving the illusion that the characters of the message are traveling across the display panel.

It is yet another object of the invention to provide a method and apparatus for producing the appearance of a traveling message in a dot matrix display panel in which the amount of additional circuitry beyond that necessary to display a static message is minimized.

It is still a further object of the invention to provide a method and apparatus for producing a traveling display as described above utilizing the same system components, i.e., Central Processor Unit (CPU) and Stored Programmable Read Only Memory (PROM), as are required to perform the over-all computation task in a system in which the dot matrix would normally display a static message.

In accordance with the invention there is provided a method and apparatus for causing the display on a dot matrix display panel to appear to travel by advancing the characters of a message to be displayed in fractional character increments. The display panel displays information characters by selectively changing the visible state of a plurality of dots on the dot matrix panel, the dots being arranged in N columns and Y rows of dots. The rows of dots extend length-wise of the display panel, and a dot is made visible by the simultaneous application of electrical signals to a specified column and row. This type of device is similar to that shown and described in the above-mentioned Burroughs Bulletin No. 1166D. The appearance of motion is accomplished by selectively making some dots visible and others not visible in a coherent predetermined sequence.

The circuitry for causing the display characters to appear to travel across the display panel includes a display character generator for cyclically providing the display panel with character information column-by-column for a complete message, and display column enabling electronics for sequentially energizing each column of the display. Synchronizing electronics is provided to synchronize the display character information applied to the Y rows of the display panel with the display column enabling electronics on a column-by-column basis. A reset circuit restarts the display column enabling electronics and refreshes the display character generator after a complete display line of character information has been displayed. An incrementing circuit increments either the display character generator or the display column enabling electronics by one column position after the complete message has been displayed and the display character generator and display column enabling electronics are reset. This gives the appearance on the display panel that the characters of the message have shifted one column position to the left or right. After the next resetting function, the character generator or enabling electronics is incremented two column positions, thereby giving the appearance that the message has again shifted to the left or right an additional column position. This process is continued until a complete character has been shifted out of the visible display, at which time the display character generator is reloaded with the complete message shifted by one character position, and the incrementing circuit is reset so that after the first complete message of the refreshed (reloaded) character information is displayed, the incrementing circuit increments the display by one column position, and the steps described above are repeated. The continuous recycling of the above-described steps gives the appearance that the displayed message travels across the display panel dropping character by character off one end of the panel. If desired, each character that is dropped off the one end appears in sequence at the other end as the incrementing and reloading functions are performed.

The apparatus of the present invention can be implemented using standard integrated circuit logic devices. In other words, the invention could be a self-contained unit which receives message information as an input and displays the message on a display panel as a traveling message. While implementing the invention using standard integrated circuit logic devices is contemplated and would represent a valid embodiment of the invention, a preferred embodiment of the invention utilizes the same system components as would ordinarily be required to perform the overall computation task of a computer type system. That is, the Central Processor Unit (CPU) and Stored Programmable Read Only Memory (PROM) can be so interconnected as to provide nearly all of the signals necessary to cause the display to travel. In this manner, a considerable amount of circuitry and associated electronics could be saved over the above-mentioned self-contained embodiment of the invention.

BRIEF DESCRIPTION OF THE DRAWINGS

The invention substantially as described in the accompanying description with reference to the accompanying drawings. In the drawings.

DETAILED DESCRIPTION OF THE PREFERRED EMBODIMENT

In the preferred embodiment, this invention represents an improvement or modification of a standard scanned diot matrix display system. That is, it is primarily useful in circumstances where the display is used to display output information generated by a digital computer. The major source of information for effecting a traveling display is stored in the memory device of a digital computer system, and by using the existing stored information, the invention utilizes a minimum of random logic devices, thereby minimizing overall cost.

In the standard configuration of a dot matrix panel display, an input clock signal is used to sequentially select dot columns for the drive circuitry that lights the dots and at the same time, through the character generator, enables the selection of the proper row-drive information. When both the column and row are simultaneously selected, the dot at the intersection of the column and row is lit. For ease of discussion, the invention will be described using as an example a display panel having seven vertical dots per column (Y=7), seven columns per character (X=7), and sixteen character positions per display line (N=16).

Further, for the purposes of the following description, the term "bannering" will be used synonomously with "traveling", both terms defining the appearance of movement of the characters on the display to the human eye.

Figure 1:
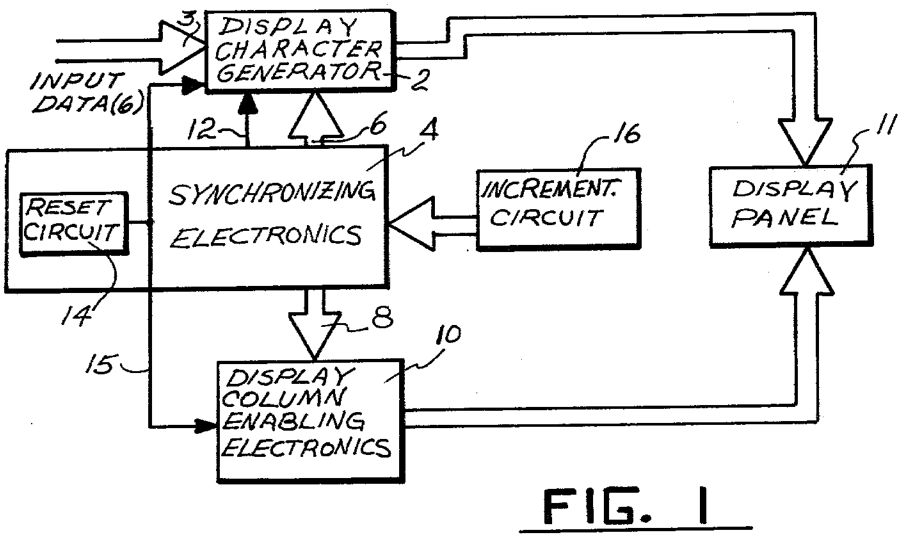
FIG. 1 is a block diagram representation of the basic circuit blocks required to produce a traveling display on a dot matrix display panel, in accordance with the present invention.

With reference to FIG. 1, display character generator 2 has available at six of its inputs data information relating to what character is to be generated. Each character is seven columns wide, five columns representing the character itself and two columns left blank to provide space between characters. This is best understood by reference to FIG. 6.

synchronizing electronics 4 sends a series of clock pulses on display character clock line 6 to the character generator 2 and an additional set of clock pulses on column enabling clock line 8 to the display column enabling electronics 10. Thus the character is displayed one column at a time in sequence. After seven clock pulses are sent and seven columns scanned, the six inputs to the character generator are changed to represent the next character to be displayed on the display panel. The synchronizing electronics 4 sends an update pulse to the display character generator on lne 12 at the end of each character, so that the information on the six input lines to character generator 2 is changed at the proper time. Reset circuit 14 generates a reset pulse on line 15 once for each complete scan of the dot matrix panel, i.e., after all 16 characters are displayed. The next reset pulse is sent to the character generator 2 and enabling electronics 10 to assure that the column scanning and the character scanning are in synchronism.

To provide the appearance of a character moving across the panel, this synchronism must be changed in a controlled manner. This is accomplished by giving one or more additional clock pulses (through the synchronizing electronics) to the character generator 2 without giving any additional pulses to the enabling electronics 10 which contains the drive circuits that scan the columns of the dot matrix display panel. It should be understood that "bannering" of the display is also attainable by incrementing the enabling electronics 10 with the additional clock pulses instead of the character tenerator 2.

After the reset pulses is over, an incrementing circuit 16 sends between zero and six pulses to the synchronizing electronics 4 activating the character generator. Each time a display line is scanned, incrementing circuit 16 sends one more pulse to the synchronizing electronics activating the character generator than for the preceding display line. After incrementing circuit 16 has sent the highest number of pulses (6), on the following reset pulse no addtional pulses are sent, but the data representing the next character is set up on the six input lines to the character generator 2. Visually, this gives the appearance that the character at the end of the display has been pushed off and the second character is now in the first position of the display. This sequence is repeated, maintaining a continuously moving display message. After this complete character has dropped off the end of the display, the input data is reloaded so that the beginning character of the message follows the last character, producing an endless stream of characters across the display at all times.

Figure 2:
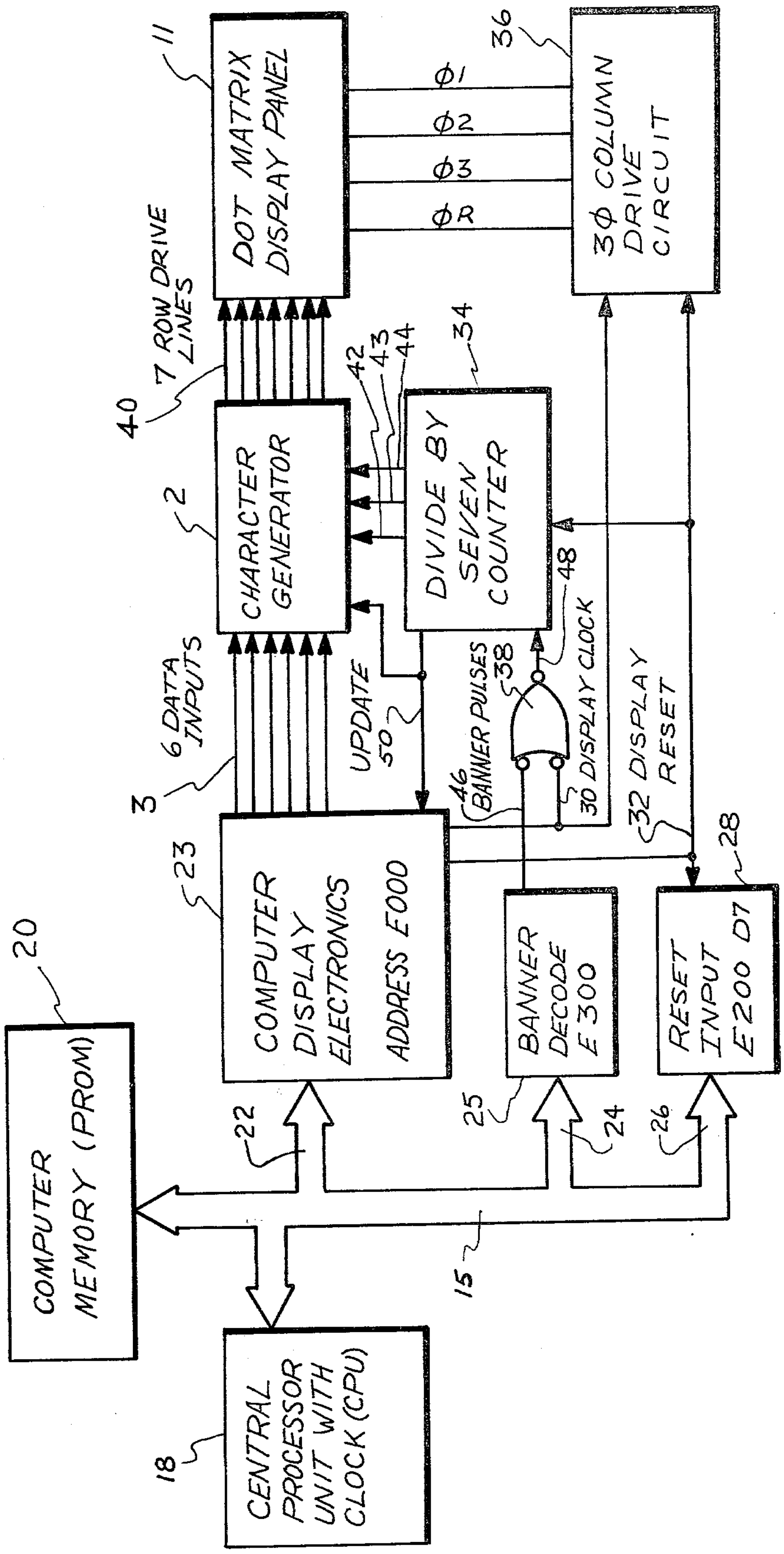
FIG. 2 is a block diagram, similar to that of FIG. 1, but showing more details as to the circuitry necessary to effect the appearance of movement of the displayed message and to show the manner in which the improvement according to the invention can be implemented in the normal CPU, PROM, and matrix display electronics of a computer system.

Referring now to FIG. 2, there is shown a generalized system for one embodiment of an electronic bannering display method for use on a dot matrix display panel in accordance with the invention. The system includes the standard computer components consisting of a CPU 18 containing the basic clock for the system, a PROM 20, two output ports 22 and 24, one (22) for the computer display electronics 23 and the other (24) for the banner decode 25, and a single reset input port 26 communicating with reset input 28, and finally a computer buss 15. Typically, the computer buss 15 will contain 16 address lines, 8 data lines, and one clock line. These components function as any conventional computer, i.e., the CPU excites the instructions stored in the PROM in a sequential manner and controlled in time by the CPU clock, typically 500 KHz clock. When the CPU activates certain sequences of address lines, it can then exchange data with the computer display electronics 23; banner decode 25; or reset input 28.

The display clock 30 is generated from the CPU clock by dividing the CPU clock by 16, then dividing again by 4 to produce the waveform of FIGS. 3B and 5B. A display reset pulse 32 is generated from the display clock 30 by conventional logic means in computer display electronics 23 and is shown in its proper time relationship in FIGS. 3A and 5A. During the display reset pulse 32, the display clock 30 is inactive, and the character data for seventeen characters are loaded into the display memory which is part of the computer display electronics 23. At the same time, a divide-by-seven counter 34 is reset so that it selects the first column of the character generator 2, and finally a three phase column drive circuit 36 selects the reset, or beginning, column $\phi$R of the dot matrix display panel 11.

Note that in order that sixteen full characters can be displayed at any instant and that, in a travelling display, one character is moving off the display line while another is moved on, a minimum of 17 characters need be loaded in the display memory.

The time required to load the display memory is longer than the display reset pulse 32, and extends into the display of the first character position. To eliminate any undesirable visual effect in the first display position, this position is always written with a blank.

After the display reset pulse 32 goes to the high logic level (FIG. 3A) the display clock 30 (FIG. 3B) will increment the divide-by-seven counter 34 and the three phase column drive circuit 36 every 135 microseconds, the divide-by-seven counter 34 getting its clock through banner gate OR circuit 38.

The display reset pulse 32 also sets the display memory pointer in the computer to the address of the first character to be displayed. This character information is transmitted over the six data input lines 3 to the character generator 2. The character generator 2 decodes these six data input lines 3 into row control information to be applied through the seven row drive lines 40 to the dot matrix display panel 11.

The display reset pulse 22 additionally sets the divide-by-seven counter 24 to its initial state, which through its output lines 42, 43, 44 representing in binary code the state of the divide-by-seven counter 34, selects the row information for the first column of the character to be displayed and sent to the seven row drive lines 40.

After the character generator 2 has sequenced through the seven columns of a character, a new character must be set up on the six data input lines 3, and character generator 2 must be reset to output the first column information or such next character. Accordingly, as divide-by-seven counter 34 counts display clocks 30, each time it has counted through seven such display clocks, an update pulse 50 is generated and sent to character generator 2 and computer display electronics 23. This update pulse carries out the required update function, and its timing sequence is shown in FIG. 5F, i.e., it occurs after the seventh column of information is outputed to the display panel 11, and before the first column of the next character is sent.

By the synchronizing effect of the display reset 32, the display memory pointer in the computer, the divide-by-seven counter 34 and the three phase column drive circuit 36 are all brought into synchronism every 15.12 ms. The display clock 30 then increments the divide-by-seven counter 34 (through banner gate 38) and the three phase column drive circuit 36 until all 112 columns are scanned on the dot matrix display panel 11. The display reset pulse 32 then initiates the next scan.

All of the foregoing is known to the prior art and results in the display of a fixed message of information characters on the display panel 11. The improvement according to the present invention concerns the additional circuitry under program control to cause the fixed display to banner. The additional circuitry involves only a minimum amount of hardware in the form of banner gate 38 and the interconnection of the banner gate with the divide-by-seven counter and the computer output port 24 for generating one or more banner pulses. The banner pulse (s) is generated by the banner decode.

Banner gate 38 is a logical OR gate arranged to produce a composite clock train of pulses producing a negative going waveform when either of its inputs goes negative. This can be best understood by reference to FIGS. 5B, 5C and 5D. The output of the banner gate 38 is termed a banner display clock 48 and is distinguished from the display clock 30 by the addition of the banner pulses 46. The banner gate 38 will output a banner display clock 48 if it receives an input pulse on either the display clock line 30 or the banner pulse line 46. The program of the computer, through the banner decode 25, generates from zero to six banner pulses 46 in sequence, just after the memory is loaded, FIG. 3D. The relationship between each reset pulse 32 and the number of banner pulses 46 produced is shown in more compressed time by the relationships of FIG. 4.

The composite banner display clock pulses 48 are counted by the divide-by-seven counter 34 and cause the output lines 42–44 to start the character generator 2 on column one the first time a complete scan is made (because there is no banner pulse 46), then on column 2 for the second scan (because one banner pulse is generated), etc., until the character generator 2 is at column 7 (because 6 banner pulses are generated). At this point, one complete character will have dropped off the left end of the display. To continue the bannering effect, it will now be necessary to reload, from the computer, all seventeen characters at the output port 22 displaced one character location from their previous position in the display memory of the computer display electronics 23. A display memory reload pulse (FIG. 4C) is thus generated, and the next scan is done without the addition of a banner pulse 46. The visual effect is thus that the characters in the display have moved one full character position to the left. As the number of banner pulses, again progressively increasing in number from zero to six, increments the divide-by-seven counter ahead of the display clock 30, the effect described above is repeated for the reloaded characters.

Figures 3, 4, 5:
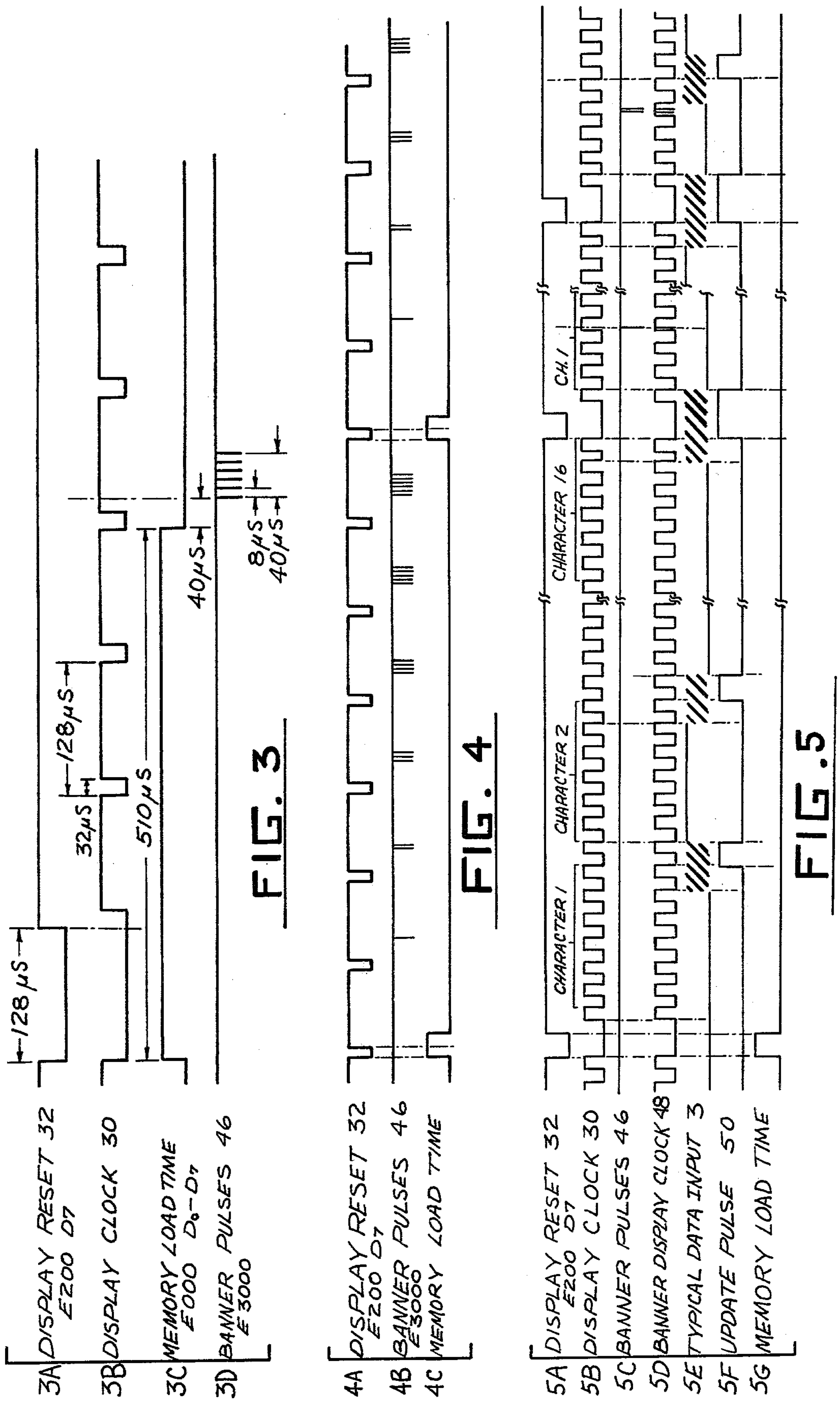
FIGS. 3, 4 and 5 show various pulse waveforms and the timing sequences of various signals between the circuit blocks shown in FIG. 2.

Other than for the compressed time relationships shown in FIG. 4, FIG. 5 is best to show the relationship between the display reset pulse 32, the display clock 30, the banner pulses 46, the composite banner clock 48, the input data lines 3, the update pulse 50, and the display memory reload time.

As explained earlier, the relationship shown in FIGS. 3A and 3B are repeated in a more compressed time relationship as seen in FIGS. 5A and 5B. After the display reset pulse is completed, the display clock 30 would normally cause the three phase column drive circuit 36 to select character 1, column 1, and character generator 2 would output the seven row drive signals to light the appropriate dots for the first column of the first character. However, and as explained earlier, for purposes of avoiding erratic behavior of the display during memory reload time (FIG. 3C), the first seven columns of the first character position of the display are purposely left blank, i.e., the seven row drive lines are not activated during the enabling of the first seven columns by the three phase column drive circuit 36. Accordingly, as seen in FIG. 5, the first visible character is that of character 2, and the three phase column drive circuit progresses through the second character column by column as the input data remains constant for each character to be displayed. FIG. 5E shows the transition period for the changing of a typical data input line 3, and for a complete timing diagram for the data input lines, reference is again made to the Burroughs Bulletin No. 1166D, FIG. 1.

Since the banner pulses 46 must occur after the memory load pulse shown in FIG. 3C, all banner pulses 46 have been chosen to be inserted after the third display clock and before the fourth display clock. In FIG. 5, since the first display line need not be incremented by one column position, no banner pulses are shown for the entire first line of characters. However, after the first reset pulse 32, and between the third and fourth display clock 30 thereafter, a single banner pulse 46 is shown at 5C, and likewise after the second reset pulse two banner pulses are shown. The composite of the banner pulses and display clock for incrementing the divide-by-seven counter and ultimately the character generator 2 is shown in FIG. 5D. The update pulse 50 necessary to bring character by character to the six data input lines 3 is shown in FIG. 5F. Finally, the single display memory reload time shown in FIG. 5G occurs at the beginning of the first scan of the original message, and a new display memory reload will not occur until after seven scans, i.e., until after six banner pulses 46 are generated, as best seen in FIG. 4C.

The transition between states of a typical data input line 3 is shown in FIG. 5E to change between the occurrence of the clock for the sixth column of one character and for the first column of the next character. Since this transition will occur during the blanking time between characters, no extraneous flashes in the display will be noticed.

Figure 6:
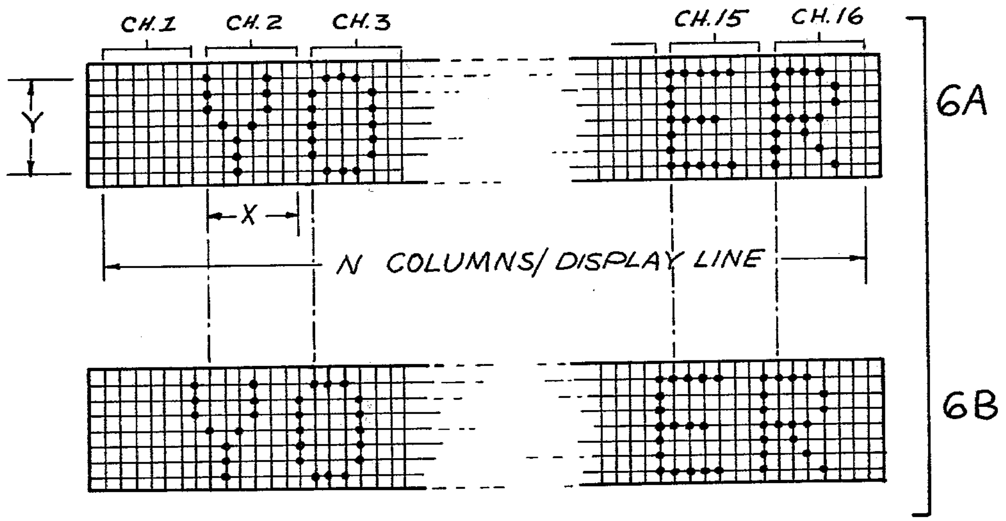
FIG. 6 is a representation of a dot matrix display panel showing a partial message at two separate times to demonstrate the appearance of movement of the message.

FIG. 6 shows a partial message, for example, "YOU ARE A WINNER", and illustrates the visual effect of the timing diagram of FIG. 5 for the first scan in which no banner pulse was generated (FIG. 6A), and for the second scan when a single banner pulse was generated (FIG. 6B). The figure also shows that the first seven columns of the first character are blanked as previously described and shows each character occupying five columns for its visual representation and two columns of blank space.

The computer program controls the loading of the display memory address and the sending of the banner pulses 46. The actual characters that represent the message are stored in another portion of the computer memory (PROM) 20. The number of characters in the display is stored at an address which is used to determine if the message should be started at the beginning.

Computer memory is used to store the message index at an address which determines what portion of the total message will be displayed on the next scan of the dot matrix display panel 11. Computer memory is also used to store the banner index which determines how many banner pulses 46 will be sent at the start of the next scan. Finally, computer memory is used to determine the program location that will start to send the required number of banner pulses 46.

From the foregoing, it can be readily realized that this invention can assume various embodiments. Thus, it is to be understood that the invention is not limited to the specific embodiments described herein, but is to be limited only by the appended claims.

What I claim is:

1. In a cyclically refreshed display device of the type which displays information characters by selectively changing the visible state of a plurality of dots on a dot matrix display panel, the dots being arranged in N columns and Y rows of dots, said rows extending lengthwise of the display panel, an electrical circuit for causing the displayed characters to appear to travel across the display panel, said circuit comprising:

first means for sequentially enabling adjacent columns in the display along the length thereof;

second means for providing row-drive signals, selectively causing each dot of each column enabled by said first means to have a predetermined visible state;

a clock circuit for generating a display clock for synchronizing said first means with said second means;

means for generating a reset pulse for resetting said first and second means after N columns have been enabled to cause said first means to repeat sequencing through said columns and to cause said second means to repeat sequencing through its selection of dots to have said predetermined visible states; and means for periodically altering said synchronizing means including means for selectively generating banner pulses, and gate means for combining said banner pulses with said display clock to define a banner display clock, said banner display clock being routed to one of said first and second means, the other of said first and second means receiving unaltered display clock, said banner display clock periodically incrementing said one of said first and second means by at least one column position, thereby displaying the information characters periodically stepwise displaced along the length of the display panel.

2. The circuit of claim 1, wherein each character is displayed within X columns of Y dots, with N columns of Y dots defining a display line of N/X characters.

3. The circuit of claim 2, wherein X is seven, and each character is visibly displayed by selectively illuminating the dots in the first five columns, the dots in the last two columns always remaining dark.

4. The circuit of claim 1, wherein said means for altering advances said second means by one column position for each reset pulse.

5. The circuit of claim 2, wherein said second means comprises:

display electronics for storing at least N+1 information characters;

means for producing update pulses for sequentially updating the characters stored in said display electronics one at a time on a plurality of data lines;

means for repeating said sequential updating upon the occurrence of said reset pulse; and a character generator for receiving character data from said data lines and deriving and generating therefrom Y row-drive signals on Y row-drive signal lines for said display panel, said character generator sequentially deriving and generating row-drive signals for columns 1 through X of each character between respective update pulses.

6. The circuit of claim 5, wherein said gate means comprises a two-input logic circuit, one input of which is said display clock and the other of which is said banner pulses; the output of said logic circuit defining said banner display clock.

7. The circuit of claim 5, wherein said banner display clock is sent to said second means.

8. The circuit of claim 7, including a divide-by-Y counter and said banner display clock is routed to said counter, divided, and sent to said character generator, said character generator being responsive to each banner display clock for developing a new set of Y row drive signals, said means for producing update pulses responsive to the passing of Y banner clocks to produce said update pulse, said update pulse being sent to said display electronics for causing an updating of the next character on said data lines and to said character generator to enable said character generator to output the first column information of the next character on said Y row-drive signal lines.

9. The circuit of claim 8, wherein said means for generating banner pulses generates no banner pulse prior to and during the first sequential updating of said plurality of information characters prior to a reset pulse, generates a single banner pulse after the occurrence of the first reset pulse thereby advancing said second means one column ahead of said first means, generates two banner pulses after the next reset pulse thereby advancing said second means two columns ahead of said first means, and so on until X-1 banner pulses have been produced.

10. The circuit of claim 9, including means for generating a memory reload signal, responsive to the occurrence of X-1 banner pulses, for reloading said display electronics with said N-1 characters displaced in sequence by one character.

11. A method for causing displayed characters to appear to travel across the display panel in a cyclically refreshed display device of the type which displays information characters by selectively changing the visible state of a plurality of dots on a dot matrix display panel, the dots being arranged in N columns and Y rows of dots, said rows extending lengthwise of the display panel, said method comprising the steps of:

(a) sequentially enabling adjacent columns in the display along the length thereof;

(b) sequentially generating groups of Y row-drive signals to selectively cause each dot of each column enabled in step (a) to have a predetermined visible state;

(c) synchronizing with a display clock the enabling of said adjacent columns with the generation of said row-drive signals;

(d) generating a reset pulse after N columns have been enabled to cause a repeated sequential enabling of said columns and to cause a repeated sequential generation of said row-drive signals; and (e) periodically altering said synchronizing means by selectively generating banner pulses, combining said banner pulses with said display clock to define a banner display clock, and routing said banner display clock to one of said first and second means, and routing unaltered display clock to the other of said first and second means, said banner display clock periodically incrementing the enabling of columns in step (a) or incrementing the sequential generation of row-drive signals in step (b) by at least one column position, thereby displaying the informative characters periodically stepwise displaced along the length of the display panel.

12. The method of claim 11, wherein each character is displayed in X columns of Y dots, with N columns of Y dots defining a display line of N/X characters.

13. The method of claim 12, wherein X is seven, and each character is visibly displayed by selectively illuminating the dots in the first five columns, the dots in the last two columns always remaining dark.

14. The method of claim 11, wherein said step of altering advances the sequential generation of row-drive signals in step (b) by one column position for each reset pulse generated.

15. The method of claim 12, wherein step (b) comprises the steps of:

(f) storing N+1 information characters;

(g) producing update pulses for sequentially updating the stored characters one at a time on a plurality of data lines;

(h) repeating said sequential updating upon the occurrence of said reset pulse; and (i) deriving and generating from the characters received on said data lines, Y row-drive signals on Y row-drive signal lines for said display panel and sequentially deriving and generating row-drive signals for columns 1 through X of each character between responsive update pulses.

16. The method of claim 15, wherein said combining step includes the step of:

OR logic gating said display clock and said banner pulse, the resultant of said OR logic gating defining said banner display clock and representing the combination of display clock and banner pulses to sequence one of steps (a) and (b), the other of steps (a) and (b) being sequenced by an unaltered display clock.

17. The method of claim 16, wherein said banner display clock is utilized to sequence step (b).

18. The method of claim 17, including providing a divide-by-Y counter and routing said banner display clock to said counter, dividing said banner display clock and utilizing said divided banner display clock to develop a new set of Y row-drive signals, said step of producing update pulses including sensing the passing of Y banner clocks to produce said update pulse, said update pulse causing an updating of the next character on said data lines and placing the first column information of the next character on said Y row-drive signal lines.

19. The method of claim 18, wherein said step of generating banner pulses generates no banner pulse prior to and during the first sequential updating of said plurality of information characters prior to a reset pulse, generates a single banner pulse after the occurrence of the first reset pulse thereby advancing the sequencing of said row-drive signals one column position, generates two banner pulses after the next reset pulse thereby advancing the sequencing of said row-drive signals two column positions, and so on until X-1 banner pulses have been produced.

20. The method of claim 19, including the step of (m) generating a memory reload signal, responsive to the occurrence of X-1 banner pulses, for reloading said N+1 characters displaced in sequence by one character.

21. In a cyclically refreshed display device of the type which displays information characters by selectively changing the visible state of a plurality of dots on a dot matrix display panel, the dots being arranged in N columns and Y rows of dots, said rows extending lengthwise of the display panel, each character being displayed within X columns of Y dots, with N columns of Y dots defining a display line of N/X characters, an electrical circuit for causing the displayed characters to appear to travel across the display panel, said circuit comprising:

first means for sequentially enabling adjacent columns in the display along the length thereof;

second means for providing row-drive signals, selectively causing each dot of each column enabled by said first means to have a predetermined visible state;

a clock circuit for generating a display clock for synchronizing said first means with said second means;

means for generating a reset pulse for resetting said first and second means after N columns have been enabled to cause said first means to repeat sequencing through said columns and to cause said second means to repeat sequencing through its selection of dots to have said predetermined visible states; and means for periodically altering said synchronizing means including means for seletively generating banner pulses, and gate means for combining said banner pulses with said display clock to define a banner display clock, said banner display clock being routed to one of said first and second means, the other of said first and second means receiving unaltered display clock, said banner display clock periodically incrementing said one of said first and second means by at least one column position, thereby displaying the information characters periodically stepwise displaced along the length of the display panel;

display electronics for storing at least N+1 information characters;

means for producing update pulses for sequentially updating the characters stored in said display electronics one at a time on a plurality of data lines;

means for repeating said sequential updating upon the occurrence of said reset pulse; and a character generator for receiving character data from said data lines and deriving and generating therefrom Y row-drive signals on Y row-drive signal lines for said display panel, said character generator sequentially deriving and generating row-drive signals for columns 1 through X of each character between respective update pulses.

22. A method for causing displayed characters to appear to travel across the display panel in a cyclically refreshed display device of the type which displays information characters by selectively changing the visible state of a plurality of dots on a dot matrix display panel, the dots being arranged in N columns and Y rows of dots, said rows extending lengthwise of the display panel, each character being displayed in X columns of Y dots, with N columns of Y dots defining a display line of N/X characters, said method comprising the steps of:

(a) sequentially enabling adjacent columns in the display along the length thereof;

(b) sequentially generating groups of Y row-drive signals to selectively cause each dot of each column enabled in step (a) to have a predetermined visible state;

(c) synchronizing with a display clock the enabling of said adjacent columns with the generation of said row-drive signals;

(d) generating a reset pulse after N columns have been enabled to cause a repeated sequential enabling of said columns and to cause a repeated sequential generation of said row-drive signals; and (e) periodically altering said synchronizing means by selectively generating banner pulses, combining said banner pulses with said display clock to define a banner display clock, and routing said banner display clock to one of said first and second means, and routing unaltered display clock to the other of said first and second means, said banner display clock periodically incrementing the enabling of columns in step (a) or incrementing the sequential generation of row-drive signals in step (b) by at least one column position, thereby displaying the informative characters periodically stepwise displaced along the length of the display panel;

step (b) further comprising the steps of:

(f) storing N+1 information characters;

(g) producing update pulses for sequentially updating the stored characters one at a time on a plurality of data lines;

(h) repeating said sequential updating upon the occurrence of said reset pulse; and (i) deriving and generating from the characters received on said data lines, Y row-drive signals on Y row-drive signal lines for said display panel and sequentially deriving and generating row-drive signals for columns 1 through X of each character between respective update pulses.

* * * * *